No. 755,340. PATENTED MAR. 22, 1904.
J. M. YOUNGER.
OIL BURNER.
APPLICATION FILED NOV. 2, 1903.
NO MODEL.
Fig. 1.
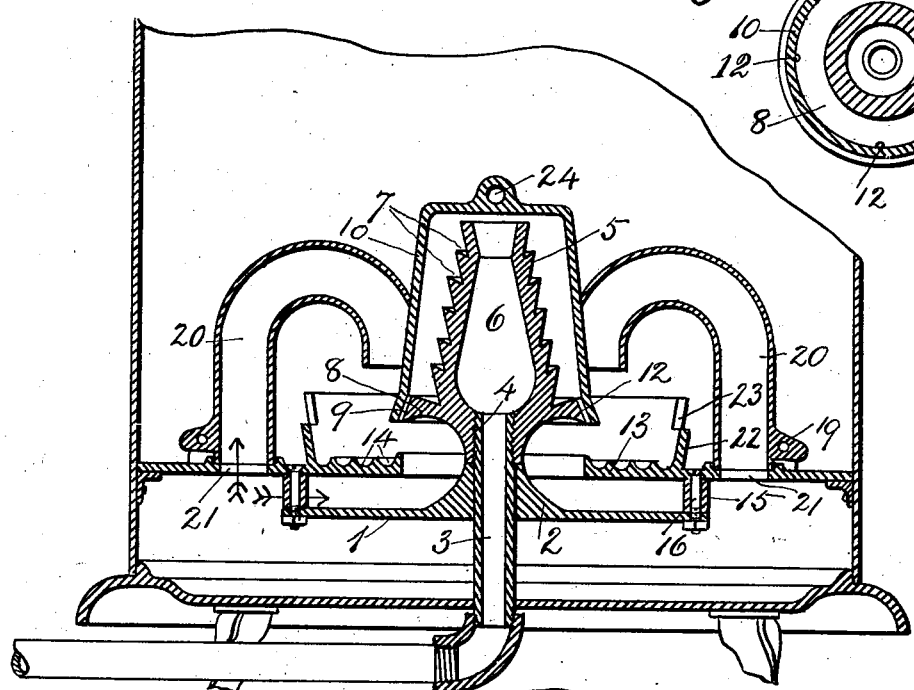
Fig. 3.
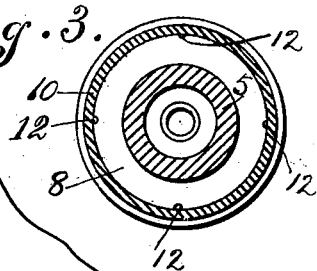
Fig. 2.
Fig. 4.
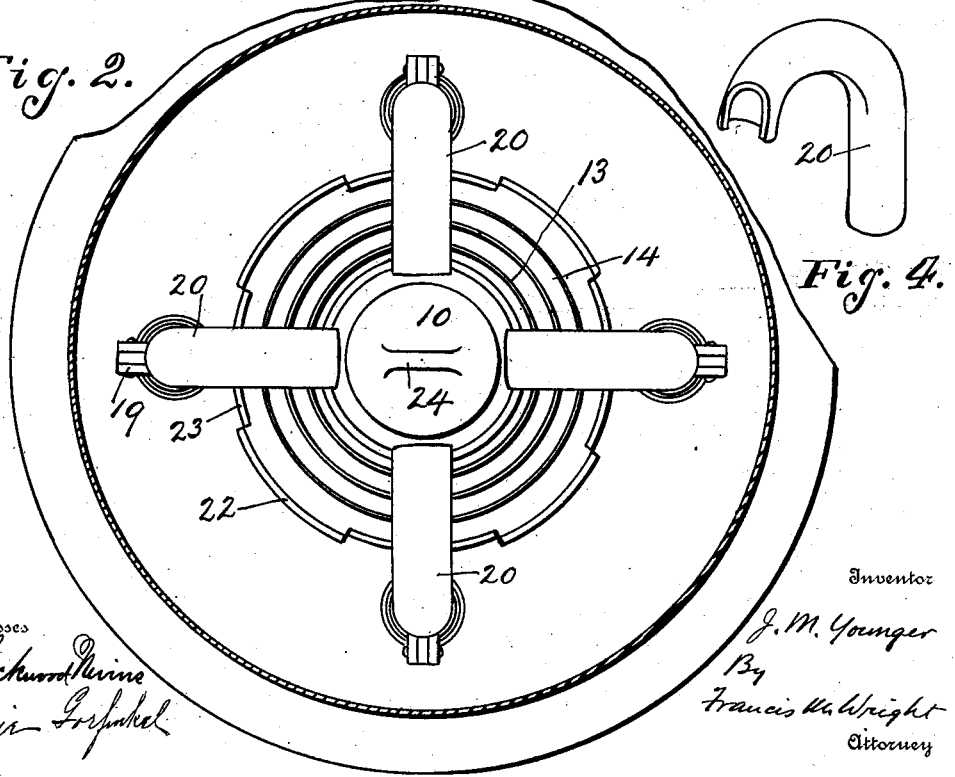
Witnesses
K. Lockwood Devine
Busin Gorfinkel
Inventor
J. M. Younger
By
Francis M. Wright
Attorney
THE NORRIS PETERS CO., PHOTO-LITHO., WASHINGTON, D. C.

No. 755,340.

Patented March 22, 1904.

UNITED STATES PATENT OFFICE.

JOSHUA M. YOUNGER, OF OAKLAND, CALIFORNIA, ASSIGNOR OF ONE-HALF TO G. A. CHAMPLIN, OF SIOUX CITY, IOWA.

OIL-BURNER.

SPECIFICATION forming part of Letters Patent No. 755,340, dated March 22, 1904.

Application filed November 2, 1903. Serial No. 179,633. (No model.)

*To all whom it may concern:*

Be it known that I, JOSHUA M. YOUNGER, a citizen of the United States, residing at Oakland, in the county of Alameda and State of California, have invented certain new and useful Improvements in Oil-Burners, of which the following is a specification.

My invention relates to improvements in oil-burners, the object of my invention being to provide a burner for use in cooking stoves or ranges, heating-stoves, or furnaces which can be used either with thin grades of crude oil or with distillates and will convert the oil into gas and consume the same without smoke, smell, or noise.

My invention therefore resides in the novel construction, combination, and arrangement of parts for the above ends hereinafter fully specified, and particularly pointed out in the claims.

In the accompanying drawings, Figure 1 is a vertical sectional view of the apparatus shown as in use in a heating-stove. Fig. 2 is a plan view of the apparatus. Fig. 3 is a plan view of the vaporizer. Fig. 4 is a perspective view of one of the air-tubes detached.

Referring to the drawings, 1 represents a base-plate, which will vary in shape, according to the nature of the stove for which it is to be used. In the present instance I have shown it circular in form for use in a round heating-stove. On the center of said plate is cast a hollow boss 2, through which extends the feed-pipe 3. The upper end of said feed-pipe is threaded, as shown at 4, and on said threaded end is screwed the vaporizer 5. Said vaporizer is of a general conical form and has a central chamber 6, through which the oil passes upward to the top, the oil then flowing over the top of the vaporizer onto a series of circular troughs or grooves 7. These troughs increase in diameter downward, so that the outer edge of each trough lies over the trough next below it, so that the oil flowing over the top of the vaporizer drips into the trough below, fills the said trough, flows over the edge of said trough, and fills the next trough, and so on. At the bottom said vaporizer has a wide circular rim 8, having a downwardly-sloping outer edge 9. Upon said sloping outer edge is supported the retort-casing 10, its lower edge 11 being flared outward, as shown, the better to center the casing upon the sloping edge 9. Said edge is formed with four vertical corrugations 12, so that when the retort-casing rests thereon there are formed four minute channels for the escape of the oil or gas generated. When the oil is first turned on, it drips through said minute channels onto a burner-plate 13, which is formed with concentric grooves 14, which the oil successively fills. This burner-plate 13 is supported on the base-plate 1 by means of spacing-sleeves 15 and bolts 16. Near the periphery of the burner-plate are pivotally mounted, by means of lugs 19, arched air-tubes 20, the inner ends of which extend downward and are open and shaped to abut loosely against the retort-casing, as shown. The burner-plate is perforated, as shown at 21, immediately below the outer ends of said air-tubes to supply air thereto. Air is thus supplied to the burner in two ways, partly by passing between the base-plate and burner-plate and between the spacing-sleeves and partly by passing upward through the air-tubes. In either case the air is heated before being supplied at the point of combustion, in the former case by contact with the under side of the inner edge of the burner-plate, which is highly heated by reason of the flames being directed downward thereupon, and in the latter case by reason of the flames passing up around the air-tubes.

It will be understood that the space between the base-plate and the burner-plate may be adjusted to give a greater or less draft of air by removing the spacing-tubes and substituting others therefor, longer or shorter, as may be desired. At a suitable distance from its center the burner-plate is formed with an annular wall 22, which is formed with square notches 23, as shown, the better to distribute the flames.

It will be seen that the base-plate and vaporizer thereon are concave or contracted at their periphery opposite to the burner-plate to form an air-conduit around the edge of the burner-plate, said contracted portion passing through the central aperture in the burner-plate, and that the inner edge of the burner-plate extends within or nearer to the center than the gas-outlet from the vaporizer. By this means the air is brought into close contact with the hot vaporizer and is thoroughly heated before being supplied to the oil-vapor. Thus a much better combustion takes place.

Should there be any carbonaceous or other deposit upon the outside of the vaporizer, this can be easily removed by first throwing back the air-tubes on their pivots and then lifting the retort-casing, which may be done by means of any suitable hook passed through an eye 24, formed or cast upon the top. After the surface of the vaporizer has been cleaned by a brush or otherwise the retort-casing is returned to its position, and the air-tubes are thrown over on their pivots, so that their open ends rest against the outer wall of the retort-casing.

The operation of the device is as follows: When the oil is turned on, it flows up through the oil-supply tube over the upper edge of the vaporizer 5, fills the annular troughs 7, and falls into the concentric grooves 14 in the burner-plate, forming a thin layer of oil thereupon. When a sufficient quantity of oil has so flowed, it is lighted, and the combustion of the oil thoroughly heats the retort-casing and the vaporizer, causing the oil therein to vaporize. After a sufficient heat has been attained oil no longer flows through the minute channels 12, but gas emerges therefrom, which burns with complete combustion owing to the air with which it is burned having been previously heated by contact with the highly-heated burner-plate or by passing through the highly-heated air-tubes.

I claim—

1. In an oil-burner the combination of a base-plate, a vaporizer supported thereon at the top of which the oil discharges, a retort-casing closed at the top and forming with said vaporizer a retort-chamber from which the vapor is discharged downward, a burner-plate, having a central aperture to surround the vaporizer, onto which the vapor generated is discharged, and arched air-tubes for conducting air and discharging the same downwardly onto said burner-plate in proximity to the place of discharge of the generated vapor, said tubes being arranged to be heated by the flames of said vapor, substantially as described.

2. In an oil-burner the combination of a base-plate, a vaporizer supported thereon at the top of which the oil discharges, a retort-casing closed at the top and forming with said vaporizer a retort-chamber from which the vapor is discharged downward, a burner-plate, having a central aperture to surround the vaporizer, onto which the vapor generated is discharged, and arched air-tubes for conducting air and discharging the same downwardly onto said burner-plate in proximity to the place of discharge of the generated vapor, said tubes being arranged to be heated by the flames of said vapor, and a serrated wall on said burner-plate for distributing the flames, substantially as described.

3. In an oil-burner the combination of a base-plate, a vaporizer supported thereon at the top of which the oil discharges, a retort-casing loosely supported upon the vaporizer and closed at the top and forming with said vaporizer a retort-chamber from which the vapor is discharged downward, a burner-plate, having a central aperture to surround the vaporizer, onto which the vapor generated is discharged, and arched air-tubes for conducting air and discharging the same downwardly onto said burner-plate in proximity to the place of discharge of the generated vapor, said tubes being arranged to be heated by the flames of said vapor, substantially as described.

4. In an oil-burner, the combination of the base-plate having a central boss, the oil-supply pipe passing therethrough, the vaporizer screwed onto said pipe and resting on said boss said vaporizer being of a general conical form and having concentric troughs increasing in diameter downward, the retort-casing closed at the top and forming with said vaporizer a retort-chamber having a downwardly-extending opening, and a burner-plate spaced from the base-plate having a central opening to permit the air to pass therethrough, the flames discharging downward from said opening onto said burner-plate, and arched air-tubes discharging the air downwardly in proximity to the discharge of the gas from the vaporizer, substantially as described.

5. In an oil-burner, the combination of the base-plate having a central boss, the oil-supply pipe passing therethrough, the vaporizer screwed onto said pipe and resting on said boss said vaporizer being of a general conical form and having concentric troughs increasing in diameter downward, the retort-casing closed at the top and forming with said vaporizer a retort-chamber having a downwardly-extending opening, and a burner-plate spaced from the base-plate having a central opening to permit the air to pass therethrough, the flames discharging downward from said opening onto said burner-plate, and pivoted arched air-tubes discharging the air downwardly in proximity to the discharge of the gas from the vaporizer, substantially as described.

In witness whereof I have hereunto set my hand in the presence of two subscribing witnesses.

JOSHUA M. YOUNGER.

Witnesses:
  FRANCES M. WRIGHT,
  BESSIE GORFINKEL.